United States Patent
Tristram

(10) Patent No.: US 8,176,466 B2
(45) Date of Patent: *May 8, 2012

(54) SYSTEM AND METHOD FOR GENERATING AN APPLICATION FRAGMENT

(75) Inventor: David Tristram, San Jose, CA (US)

(73) Assignee: Adobe Systems Incorporated, San Jose, CA (US)

(*) Notice: Subject to any disclaimer, the term of this patent is extended or adjusted under 35 U.S.C. 154(b) by 1137 days.

This patent is subject to a terminal disclaimer.

(21) Appl. No.: 11/951,951

(22) Filed: Dec. 6, 2007

(65) Prior Publication Data
US 2009/0089752 A1 Apr. 2, 2009

Related U.S. Application Data

(60) Provisional application No. 60/976,759, filed on Oct. 1, 2007.

(51) Int. Cl.
*G06F 9/44* (2006.01)
(52) U.S. Cl. ......... 717/105; 717/113
(58) Field of Classification Search .......... 717/105
See application file for complete search history.

(56) References Cited

U.S. PATENT DOCUMENTS

| | | | |
|---|---|---|---|
| 4,752,893 A | 6/1988 | Guttag et al. | |
| 5,168,441 A | 12/1992 | Onarheim et al. | |
| 5,289,574 A | 2/1994 | Sawyer | |
| 5,297,250 A | 3/1994 | Leroy et al. | |
| 5,357,603 A | 10/1994 | Parker | |
| 5,388,201 A | 2/1995 | Hourvitz et al. | |
| 5,481,665 A | 1/1996 | Okada et al. | |
| 5,490,246 A | 2/1996 | Brotsky et al. | |
| 5,522,022 A | 5/1996 | Rao et al. | |
| 5,537,630 A | 7/1996 | Berry et al. | |
| 5,564,002 A | 10/1996 | Brown | |
| 5,588,098 A | 12/1996 | Chen et al. | |
| 5,602,997 A | 2/1997 | Carpenter et al. | |

(Continued)

FOREIGN PATENT DOCUMENTS
EP 548586 6/1993
(Continued)

OTHER PUBLICATIONS

Adobe Creative Team, "Adobe GoLive Classroom in a Book"; Adobe Press, Aug. 16, 2004.*

(Continued)

*Primary Examiner* — Wei Zhen
*Assistant Examiner* — Kevin Dothager
(74) *Attorney, Agent, or Firm* — Fish & Richardson P.C.

(57) ABSTRACT

Methods, systems, and apparatus, including computer program products, for storing an application fragment. In one aspect, a method includes presenting a component in a donor application window corresponding to a donor application, wherein the donor application is executing in a computing system; receiving input selecting the component in the donor application window for insertion into a file system associated with the computing system; generating an application fragment corresponding to the component; and storing the application fragment in the file system. Further, the method can include inserting the application fragment into a recipient application window associated with a recipient application and activating functionality of the recipient application based on the application fragment. Additionally, the application fragment can be activated in the file system and an application including at least a component based on the application fragment can be generated in response to the activating.

24 Claims, 9 Drawing Sheets

U.S. PATENT DOCUMENTS

| | | | |
|---|---|---|---|
| 5,638,501 A | 6/1997 | Gough et al. |
| 5,651,107 A | 7/1997 | Frank et al. |
| 5,731,819 A | 3/1998 | Gagne et al. |
| 5,742,285 A | 4/1998 | Ueda |
| 5,764,229 A | 6/1998 | Bennett |
| 5,764,238 A | 6/1998 | Lum et al. |
| 5,793,376 A | 8/1998 | Tanaka et al. |
| 5,796,402 A | 8/1998 | Ellison-Taylor |
| 5,801,703 A | 9/1998 | Bowden et al. |
| 5,809,230 A | 9/1998 | Pereira |
| 5,835,692 A | 11/1998 | Cragun et al. |
| 5,835,693 A | 11/1998 | Lynch et al. |
| 5,838,316 A | 11/1998 | Arruza |
| 5,877,741 A | 3/1999 | Chee et al. |
| 5,877,762 A | 3/1999 | Young |
| 5,883,639 A | 3/1999 | Walton et al. |
| 5,913,063 A | 6/1999 | McGurrin et al. |
| 5,920,659 A | 7/1999 | Iverson et al. |
| 5,933,148 A | 8/1999 | Oka et al. |
| 5,949,409 A | 9/1999 | Tanaka et al. |
| 5,978,579 A | 11/1999 | Buxton et al. |
| 6,005,568 A | 12/1999 | Simonoff et al. |
| 6,006,231 A | 12/1999 | Popa |
| 6,011,562 A | 1/2000 | Gagne et al. |
| 6,031,937 A | 2/2000 | Graffagnino |
| 6,045,446 A | 4/2000 | Ohshima |
| 6,075,543 A | 6/2000 | Akeley |
| 6,128,010 A | 10/2000 | Baxter et al. |
| 6,144,381 A | 11/2000 | Lection et al. |
| 6,154,601 A | 11/2000 | Yaegashi et al. |
| 6,166,748 A | 12/2000 | Van Hook et al. |
| 6,191,797 B1 | 2/2001 | Politis |
| 6,195,664 B1 | 2/2001 | Tolfa |
| 6,211,890 B1 | 4/2001 | Ohba |
| 6,246,418 B1 | 6/2001 | Oka |
| 6,266,053 B1 | 7/2001 | French et al. |
| 6,266,430 B1 | 7/2001 | Rhoads |
| 6,272,484 B1 | 8/2001 | Martin et al. |
| 6,272,558 B1 | 8/2001 | Hui et al. |
| 6,278,448 B1 | 8/2001 | Brown et al. |
| 6,304,684 B1 | 10/2001 | Niczyporuk et al. |
| 6,307,574 B1 | 10/2001 | Ashe et al. |
| 6,310,621 B1 | 10/2001 | Gagne et al. |
| 6,321,314 B1 | 11/2001 | Van Dyke |
| 6,353,437 B1 | 3/2002 | Gagne |
| 6,356,903 B1 | 3/2002 | Baxter et al. |
| 6,369,823 B2 | 4/2002 | Ohba |
| 6,369,830 B1 | 4/2002 | Brunner et al. |
| 6,411,301 B1 | 6/2002 | Parikh et al. |
| 6,412,021 B1 | 6/2002 | Nguyen et al. |
| 6,421,058 B2 | 7/2002 | Parikh et al. |
| 6,424,348 B2 | 7/2002 | Parikh et al. |
| 6,427,230 B1 | 7/2002 | Goiffon et al. |
| 6,452,600 B1 | 9/2002 | Parikh et al. |
| 6,456,290 B2 | 9/2002 | Parikh et al. |
| 6,457,034 B1 | 9/2002 | Morein |
| 6,466,218 B2 | 10/2002 | Parikh et al. |
| 6,469,714 B2 | 10/2002 | Buxton et al. |
| 6,483,524 B1 | 11/2002 | Petchenkine et al. |
| 6,489,963 B2 | 12/2002 | Parikh et al. |
| 6,512,522 B1 | 1/2003 | Miller et al. |
| 6,525,736 B1 | 2/2003 | Erikawa et al. |
| 6,526,174 B1 | 2/2003 | Graffagnino |
| 6,542,160 B1 | 4/2003 | Abgrall |
| 6,542,166 B1 | 4/2003 | Washington et al. |
| 6,571,328 B2 | 5/2003 | Liao et al. |
| 6,573,896 B1 | 6/2003 | Ribadeau Dumas et al. |
| 6,577,317 B1 | 6/2003 | Duluk, Jr. et al. |
| 6,580,430 B1 | 6/2003 | Hollis et al. |
| 6,590,592 B1 | 7/2003 | Nason et al. |
| 6,609,977 B1 | 8/2003 | Shimizu et al. |
| 6,614,444 B1 | 9/2003 | Duluk, Jr. et al. |
| 6,618,048 B1 | 9/2003 | Leather |
| 6,636,214 B1 | 10/2003 | Leather et al. |
| 6,639,595 B1 | 10/2003 | Drebin et al. |
| 6,664,958 B1 | 12/2003 | Leather et al. |
| 6,664,962 B1 | 12/2003 | Komsthoeft et al. |
| 6,664,986 B1 | 12/2003 | Kopelman et al. |
| 6,674,438 B1 | 1/2004 | Yamamoto et al. |
| 6,687,745 B1 | 2/2004 | Franco et al. |
| 6,697,074 B2 | 2/2004 | Parikh et al. |
| 6,707,462 B1 | 3/2004 | Peercy et al. |
| 6,714,201 B1 | 3/2004 | Grinstein et al. |
| 6,715,053 B1 | 3/2004 | Grigor |
| 6,717,599 B1 | 4/2004 | Olano |
| 6,734,864 B2 | 5/2004 | Abgrall |
| 6,765,592 B1 | 7/2004 | Pletcher et al. |
| 6,788,318 B2 | 9/2004 | Chen |
| 6,806,892 B1 | 10/2004 | Plow et al. |
| 6,906,720 B2 | 6/2005 | Emberling et al. |
| 6,910,000 B1 | 6/2005 | Yedidia et al. |
| 6,911,984 B2 | 6/2005 | Sabella et al. |
| 6,931,633 B1 | 8/2005 | Vazquez et al. |
| 6,944,829 B2 | 9/2005 | Dando |
| 6,985,939 B2 | 1/2006 | Fletcher et al. |
| 6,993,721 B2 | 1/2006 | Rosin et al. |
| 7,016,011 B2 | 3/2006 | De Haan |
| 7,027,055 B2 | 4/2006 | Anderson et al. |
| 7,050,955 B1 | 5/2006 | Carmel et al. |
| 7,337,409 B2 | 2/2008 | Doblmayr et al. |
| 7,496,888 B2 | 2/2009 | Sanjar et al. |
| 7,546,543 B2 * | 6/2009 | Louch et al. ............... 715/762 |
| 7,568,165 B2 * | 7/2009 | Amadio et al. ............ 715/779 |
| 7,644,391 B2 * | 1/2010 | Fisher et al. .............. 717/109 |
| 7,657,842 B2 * | 2/2010 | Matthews et al. .......... 715/788 |
| 7,665,032 B2 * | 2/2010 | Fisher et al. .............. 715/779 |
| 8,060,855 B2 * | 11/2011 | Hegde et al. .............. 717/103 |
| 8,095,911 B2 * | 1/2012 | Ronen et al. .............. 717/122 |
| 2001/0030647 A1 | 10/2001 | Sowizral et al. |
| 2001/0035885 A1 | 11/2001 | Iron et al. |
| 2002/0065946 A1 | 5/2002 | Narayan |
| 2002/0067418 A1 | 6/2002 | Hiroaki |
| 2002/0078453 A1 | 6/2002 | Kuo |
| 2002/0087660 A1 | 7/2002 | Martin et al. |
| 2002/0089526 A1 | 7/2002 | Buxton et al. |
| 2002/0093516 A1 | 7/2002 | Brunner et al. |
| 2002/0112180 A1 | 8/2002 | Land et al. |
| 2002/0118217 A1 | 8/2002 | Fujiki |
| 2002/0120673 A1 | 8/2002 | Tolson et al. |
| 2002/0129092 A1 | 9/2002 | Tolson et al. |
| 2002/0140740 A1 | 10/2002 | Chen |
| 2002/0171682 A1 | 11/2002 | Frank et al. |
| 2002/0174181 A1 | 11/2002 | Wei |
| 2002/0186257 A1 | 12/2002 | Cadiz et al. |
| 2003/0005412 A1 | 1/2003 | Eanes |
| 2003/0008711 A1 | 1/2003 | Corbo |
| 2003/0020671 A1 | 1/2003 | Santoro et al. |
| 2003/0046316 A1 | 3/2003 | Gergic et al. |
| 2003/0067489 A1 | 4/2003 | Wong et al. |
| 2003/0080995 A1 | 5/2003 | Tenenbaum et al. |
| 2003/0123739 A1 | 7/2003 | Graffagnino |
| 2003/0146934 A1 | 8/2003 | Bailey et al. |
| 2003/0158975 A1 | 8/2003 | Frank et al. |
| 2003/0164862 A1 | 9/2003 | Cadiz et al. |
| 2003/0169306 A1 | 9/2003 | Makipaa et al. |
| 2003/0174136 A1 | 9/2003 | Emberling et al. |
| 2003/0174154 A1 | 9/2003 | Yukie et al. |
| 2003/0189597 A1 | 10/2003 | Anderson et al. |
| 2004/0012626 A1 | 1/2004 | Brookins |
| 2004/0032409 A1 | 2/2004 | Girard |
| 2004/0036711 A1 | 2/2004 | Anderson |
| 2004/0039934 A1 | 2/2004 | Land et al. |
| 2004/0056896 A1 | 3/2004 | Doblmayr et al. |
| 2004/0179019 A1 | 9/2004 | Sabella et al. |
| 2004/0212640 A1 | 10/2004 | Mann et al. |
| 2004/0215740 A1 | 10/2004 | Frank et al. |
| 2004/0223003 A1 | 11/2004 | Heirich et al. |
| 2004/0255253 A1 | 12/2004 | Marcjan |
| 2004/0261012 A1 | 12/2004 | Balsiger |
| 2004/0261037 A1 | 12/2004 | Ording et al. |
| 2004/0261038 A1 | 12/2004 | Ording et al. |
| 2005/0010634 A1 | 1/2005 | Henderson et al. |
| 2005/0021935 A1 | 1/2005 | Schillings et al. |
| 2005/0022139 A1 | 1/2005 | Gettman et al. |
| 2005/0039144 A1 | 2/2005 | Wada et al. |
| 2005/0060655 A1 | 3/2005 | Gray et al. |
| 2005/0060661 A1 | 3/2005 | Kawahara et al. |

| | | | |
|---|---|---|---|
| 2005/0088447 | A1 | 4/2005 | Hanggie et al. |
| 2005/0088452 | A1 | 4/2005 | Hanggie et al. |
| 2005/0144563 | A1 | 6/2005 | Hough et al. |
| 2005/0160368 | A1 | 7/2005 | Liu et al. |
| 2005/0168471 | A1 | 8/2005 | Paquette |
| 2005/0168476 | A1 | 8/2005 | Levene et al. |
| 2005/0193368 | A1 | 9/2005 | Becker et al. |
| 2005/0215310 | A1 | 9/2005 | Boyd et al. |
| 2005/0240857 | A1 | 10/2005 | Benedict et al. |
| 2005/0256940 | A1 | 11/2005 | Henderson et al. |
| 2005/0278651 | A1 | 12/2005 | Coe et al. |
| 2005/0282612 | A1 | 12/2005 | Mathews |
| 2005/0283734 | A1 | 12/2005 | Santoro et al. |
| 2006/0064674 | A1 | 3/2006 | Olson et al. |
| 2006/0075106 | A1 | 4/2006 | Hochmuth et al. |
| 2006/0075141 | A1 | 4/2006 | Boxenhorn |
| 2006/0089840 | A1 | 4/2006 | May |
| 2006/0123356 | A1 | 6/2006 | Sobeski et al. |
| 2006/0218499 | A1 | 9/2006 | Matthews |
| 2006/0294498 | A1 | 12/2006 | Partamian |
| 2007/0038934 | A1 | 2/2007 | Fellman |
| 2007/0044029 | A1 | 2/2007 | Fisher et al. |
| 2007/0044039 | A1 | 2/2007 | Amadio et al. |
| 2007/0061724 | A1 | 3/2007 | Slothouber et al. |
| 2007/0074126 | A1* | 3/2007 | Fisher et al. ................. 715/764 |
| 2007/0074157 | A1 | 3/2007 | Worden et al. |
| 2007/0101291 | A1 | 5/2007 | Forstall et al. |
| 2007/0157101 | A1 | 7/2007 | Indiran et al. |
| 2007/0203984 | A2 | 8/2007 | AlHusseini et al. |
| 2007/0209013 | A1 | 9/2007 | Ramsey et al. |
| 2007/0234195 | A1 | 10/2007 | Wells |
| 2008/0155518 | A1 | 6/2008 | Van Wyk et al. |
| 2008/0248834 | A1 | 10/2008 | Chatterjee et al. |

FOREIGN PATENT DOCUMENTS

| | | |
|---|---|---|
| EP | 0694879 | 1/1996 |
| EP | 1383080 | 1/2004 |
| EP | 0972273 | 3/2004 |
| WO | WO98/45815 | 10/1998 |
| WO | WO02/09039 | 1/2002 |
| WO | WO2004/027707 | 4/2004 |

OTHER PUBLICATIONS

Fejes, Programming Konfabulator Widgets, 10x More Productive Blog (2005).*
Akeley, et al. "Real-Time Graphics Architecture," downloaded from the internet at http://www.gaphics.stanford.edu/courses/cs448a-01-fall, 2001, 20 pages.
Altman, R.B., "Visual Quickstart Guide Power Point 2000/98"Peachpit Press, May 7, 1999, Retrieved from the Internet at http://www.proquest.safaribooksonline.com/0201354411, 7 pages.
Apple Computer, Inc. "Writing a Desk Accessory, Developer Connection", downloaded from the internet at URL: http://developer.apple.com/documentation/mac/devices/devices-16.html on Jan. 3, 2006, 3 pages.
Cadiz, et al., "Sideshow: Providing Peripheral Awareness of Important Information," Technical Report MSR-TR-2001-83, Sep. 14, 2001, downloaded from the internet at ftp://ftp.research.microsoft.com/pub/tr/tr-2001-83.pdf, 9 pages.
Casteller, "International Search Report", European Patent Office, PCT/US2005/008805, Aug. 8, 2005, 3 pages.
Chanda, "Copying Reusable Components from a Remote Source", Pending U.S. Appl. No. 12/062,487, filed Apr. 3, 2008, 35 pages, to be published by USPTO.
Conner, et al. "Three-Dimensional Widgets" ACM Proceedings of the 1992 symposium on Interactive 3D graphics, Special Issue of Computer Graphics, vol. 26, 1992, pp. 183-188, 230-231 8 pages).
DelChiaro, "International Search Report", European Patent Office, PCT/US2005/008804, Jul. 27, 2005, 3 pages.
Desktop Sidebar, "Desktop Sidebar Home Page", downloaded from the internet at http://webarchive.org/web/20040101160831/http://www.desktopsidebar.com/, on May 11, 2007, 5 pages.
Elliott, "Programming Graphics Processors Functionally," Proceedings of the 2004 Haskell Workshop, Sep. 22, 2004. 11 pages.

Farrand, et al. "Common Elements in Today's Graphical User Interfaces: The Good, the Bad, and the Ugly," Proceedings of the Interchi '93, Human Factors in Computing Systems, 1993, pp. 470-473.
Fried, "Developer Calls Apple's Tiger a Copycat," CNET News.com, Jun. 28, 2004, downloaded from the internet at http://zdnet.com.com/2102-1104 2-5250692.html?tag=printthis on Jul. 1, 2004, 2 pages.
Fried, "For Apple's Tiger, the Keyword is Search", CNET News.com, Jun. 28, 2004, downloaded from the internet at http://zdnet.com.com/2102-1103_2-5250346.html?tag=printthis on Jul. 1, 2004, 2 pages.
Friedman, et al. "Dashboard Blog Dec. 4, 2003", downloaded from the internet at http://www.nat.org/dashboard/blog.php3, on May 11, 2007, 31 pages.
Gruber, "Dashboard vs. Konfabulator", Jun. 2004, downloaded from the internet at http://daringfireball.net/2004/06/dashboard_vs_konfabulator, on May 11, 2007, 9 pages.
Haeberli, et al., "The Accumulation Buffer: Hardware Support for High-Quality Rendering," Computer Graphics, vol. 24, No. 4, Aug. 1990, pp. 309-318.
Konfabulator, "Cupertino, Start your Photocopiers!," Retrieved from the internet at http://www.konfabulator.com, on Jul. 1, 2004, 1 page.
Konfabulator, "Konfabulator & Widget Basics," Retrieved from the Internet at http://www.konfabulator.com/info/basics html, on Jul. 1, 2004, 3 pages.
Konfabulator, "Screenshots," Retrieved from the Internet at http://www.konfabulator.com/info/screenshots.html on Jul. 1, 2004, 2 pages.
Konfabulator, "What is Konfabulator?," Retrieved from the Internet at http://www.konfabulator.com/info/, on Jul. 1, 2004, 3 pages.
Lammers, et al., "Maya 4.5 Fundamentals: Chapter 13, Particle Systems and Dynamics", New Riders Publishing, 2002, 12 pages.
Nvidia, "Teaching Cg," , downloaded from the internet at http://developer.nvidia.com/docs/io/4106/Teaching-Cg.pdf, to be published by the USPTO, 16 pages.
Puder, "Extending Desktop Applications to the Web," ACM International Conference Proceedings Series, Proceedings of the Jun. 2004 International Symposium on Information and Communication Technologies, 2004, vol. 90, pp. 8-13 (6 pages).
Segal, et al. "The OpenGL Graphics System: A Specification (Version 1.5)," downloaded from the internet at http://www.opengl.org/documentation/specs/version1.5/glspec15.pdf, 2003, 333 pages.
Shantzis, Michael A., "A Model for Efficient and Flexible Image Computing," ACM Proceedings of the 21st annual conference on Computer graphics and interactive techniques, 1994, pp. 147-154.
Shiozawa, Hidekazu et al., "Perspective Layered Visualization of Collaborative Workspaces," Proceedings of the International ACM SIGGROUP conference on Supporting Group Work, 1999, pp. 71-75.
Snippet Software Inc. et al. "Corporate Portal Newsletter: Product Spotlight Non-Browser Based Portal Solution from Snippets Software, Inc.", vol. 1, No. 10, Oct. 2000 downloaded from the internet at http://web.archive.org/web/20010603050951/www.snippets.com/download/Corporate_Portal_Article.pdf, on Jul. 22, 2008, 3 pages.
Snippet Software Inc. et al. "Snippets Software" downloaded from the internet at http://www.snippets.com/, on Jun. 11, 2001, 16 pages.
Staples, "Representation in Virtual Space: Visual Convention in the Graphical User Interface", ACM Proceedings of the INTERACT '93 and CHI '93 Conference on Human Factors in Computing Systems, 1993, pp. 348-354 and 542 (8 pages).
Stardock Corporation "DesktopX Whitepaper and users Guide Version 2" downloaded from the internet at www.stardock.net/media/whitepaper_desktopx.html, on May 14, 2007, 72 pages.
Tang, et al., "ConNexus to Awarenex: Extending Awareness to Mobile Users," ACM Proceedings of the SIGCHI conference on Human factors in computing systems, 2001, pp. 221-228 (8 pages).
Triest, "International Search Report and Written Opinion", European Patent Office, PCT/US2005/022152, Jul. 10, 2006, 8 pages.
Ullenboom, "Java ist auch eine Insel," downloaded from the internet at http://www.galileocomputing.de/openbook/javainsel2//java_140000.htm#Xxx998138, on Apr. 13, 2006, 3 pages.
Van Gelder, et al. "Direct Volume Rendering with Shading via Three-Dimensional Textures," ACM Proceedings of the 1996 symposium on Volume visualization, 1996, 9 pages.

Vieira, "International Search Report and Written Opinion", European Patent Office, PCT/US2005/022579, 15 pages.
W3C, "Objects, Images and Applets," Feb. 10, 2003, Retrieved from the Internet at http://www.web.archive.org/web/20030210154019/http://www.w3.org/TRR/REC-html140/struct/objects.html, 21 pages.
Wardell, "Konfabulator for Windows", downloaded from the internet at URL: http://www.xpthemes.com/forums.asp?MID=19&CMID=19&AID=4472, on Jan. 10, 2004, 6 pages.
Webster, "Reusing Components in a Running Application", Pending U.S. Appl. No. 11/845,703, filed Aug. 27, 2007, 26 pages, to be published by USPTO.
Wikipedia, "Comparison of Widget Engines", downloaded from the internet at http://en.wikipedia.org/wiki/Comparison_of_widget_engines, on May 11, 2007, 6 pages.
Wikipedia, "Windows Sidebar", downloaded from the internet at http://en.wikipedia.org/wiki/Windows_Sidebar, on May 11, 2007, 2 pages.
Daniel et al., "Mashing Up Context-Aware Web Applications: A Component-Based Development Approach," WEB Information Systems Engineering—Wise 2008; Lecture Notes in Computer Science, vol. 5175, 2008, pp. 250-263, XP019103131.
Grolaux et al., "Attach Me, Detach Me, Assemble Me Like You Work," Human-Computer Interaction—Interact 2005, Lecture Notes in Computer Science; LNCS Springer, Berlin DE 3585:198-212, XP019018979 (Jan. 1, 2005).
Streitz et al., "i-Land: An Interactive Landscape for Creativity and Innovation," CHI 1999 Conference Proceedings Human Factors in Computing System. Pittsburg, PA (May 15-20, 1999), pp. 120-127, XP000894211.
Thomas, Roger, Authorized Officer, European Patent Office, in PCT International Application No. PCT/US2008/074059, the International Search Report & Written Opinion, mailed Jan. 23, 2009, 50 pages.
International Search Report and Written Opinion dated Mar. 24, 2009 for International Application No. PCT/US2008/078496, filed Jan. 10, 2008 (30 pages).
Carciofi, Authorized Officer, "International Search Report and Written Opinion", Patent Cooperation Treaty, PCT/US2009/033114, dated May 7, 2009, 12 pages.
O'Conner John, "Creating Extensible Applications with the Java Platform," Sun Java Technical Articles [Online] Sep. 2007, retrieved from the Internet: URL:http://java.sun.com/developer/technicalArticles/javase/extensible/ [retrieved on Apr. 27, 2009], 10 pages.
Adobe Systems Incorporated, "Adobe GoLive, Version 6.0," downloaded from the internet at www.adobe.com/golive, 2002, 4 pages.
Adobe Systems Incorporated, "A Manager's Introduction to Adobe eXtensible Metadata Platform, The Adobe XML Metadata Framework" White Paper, 2001, 18 pages.
Adobe Systems Incorporated, "Embedding XMP Metadata in Application Files (Draft)," Sep. 14, 2001, 16 pages.
Adobe Systems Incorporated, "Extensible Metadata Platform (XMP)," downloaded from the internet at www.adobe.com/products/smp/main.html on Apr. 12, 2003, 2 pages.
Adobe Systems Incorporated, "XMP—Extensible Metadata Platform, Version 1.5," Sep. 14, 2001, 88 pages.
Beged-Dov, et al. "RDF Site Summary (RSS) 1.0", downloaded from the internet at http://web.resources.org/rss/1.0/spec on Apr. 15, 2003, 23 pages.
Gellersen, et al. "WebComposition: An Object-Oriented Support System for the Web Engineering Lifecycle", Proceedings of WWW6, 1997, 11 pages.
IDEAlliance, et al. "PRISM: Publishing Requirements for Industry Standard Metadata, Version 1.2(e), First Public Draft," Sep. 4, 2002, 95 pages.
IDEAlliance, Inc., "Information and Content Exchange, An SML Based Distribution Protocol," 2002, downloaded from the internet at http://www.icestandard.org/servlet/RetrievePage?site=ice&page=aboutice on Feb. 5, 2003, 7 pages.
Interwoven, Inc., "XML in a Content Infrastructure: Conducting Business on the Web", copyright 2001, Interwoven, Inc., 21 pages.
Microsoft Corporation, "Microsoft SharePoint Portal Server 2001; Architecting Web Parts for Business Applications—(prepared in conjunction with Avanade) White Paper," Jun. 2001, 11 pages.
Wikipedia "AppleScript", from the internet at http://en.wikipedia.org/wiki/AppleScript on Dec. 11, 2007, 8 pages.
W3C, "HTML 4.01 Specification, W3C Recommendation Dec. 24, 1999", downloaded from the internet at http://www.w3.org/TR/html14/ on Apr. 16, 2003, 453 pages.
W3C, "Resource Description Framework (RDF) Model and Syntax Specification, W3C Recommendation Feb. 22, 1999", downloaded from the internet at http://www.w3.org/TR/1999/REC-rdf-syntax-19990222/ on Apr. 15, 2003, 56 pages.
W3C, The Information and Content Exchange (ICE) Protocol, w3C Note 26 Oct. 1998:, downloaded from the internet at http://www.w3.org/TR/NOTE-ice.html on Apr. 15, 2003, 129 pages.
W3C, XSL Transformations (XSLT) Version 1.0, W3C Recommendation Nov. 16, 1999, downloaded from the internet at http://www.w3.org/TR/xslt W3C Recommendation Nov. 16, 1999, 90 pages.
W3C "XHTML™ 1.0 The Extensible HyperText Markup Language (Second Edition), A Reformulation of HTML 4 in XML 1.0, W3C Recommendation Jan. 16, 2000, revised Aug. 1, 2002", downloaded from the internet at http://www.w3.org/TR/xhtml1/ on Apr. 16, 2003, 26 pages.
Lowery et al., Macromedia® Dreamweaver® MX 2004 Web Application Recipes: Safari Books Online, Nov. 24, 2003, published by Macromedia, 2 pages.
Miller, Michael "Google.pedia: The Ultimate Google Resource," Que, pp. 561-565 (Jul. 11, 2006), downloaded from the Internet at http://academic.safaribookson1ine.com/book/web-applications-and-services/078973639x, 6 pages.
Miller, Michael, How Microsoft Windows Vista Works, Dec. 28, 2006, published by Microsoft, download from in internet at http://academic.safaribooksonline.com/book/operating-systenns/0789735857, 3 pages.
U.S. Appl. No. 12/062,487, filed Apr. 3, 2008, in Office Action dated Sep. 7, 2010, 30 pages.

\* cited by examiner

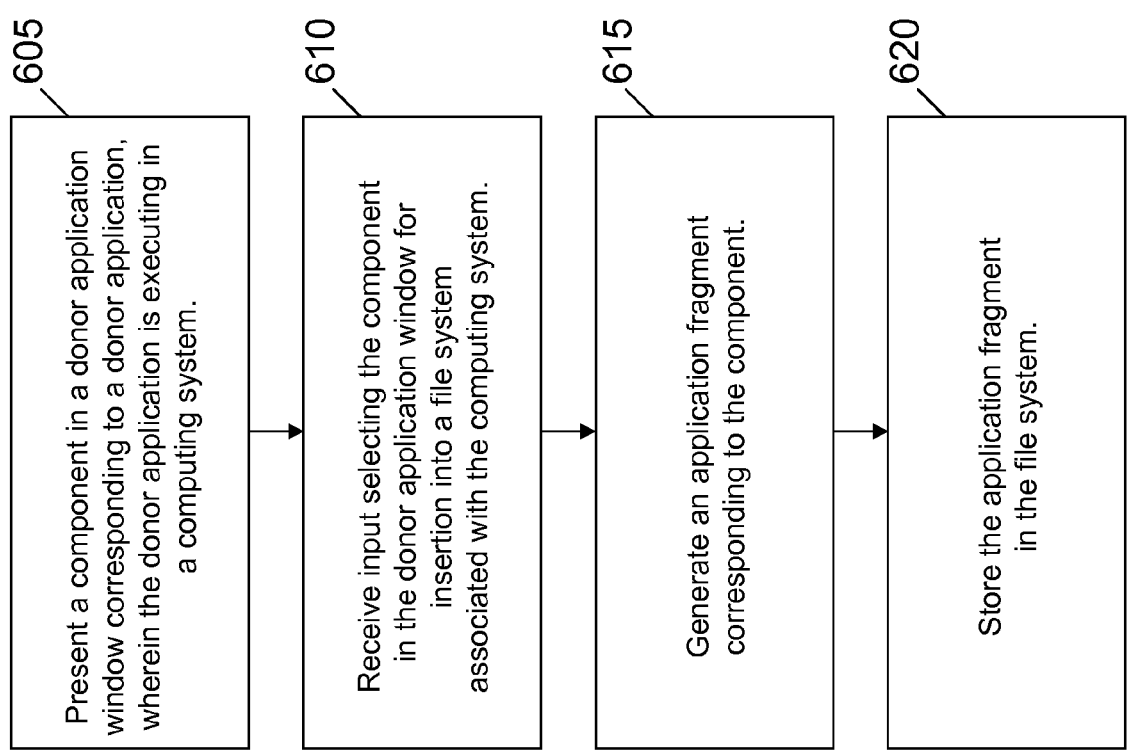

US 8,176,466 B2

SYSTEM AND METHOD FOR GENERATING AN APPLICATION FRAGMENT

CROSS-REFERENCE TO RELATED APPLICATION

This application claims priority to U.S. Provisional Application Ser. No. 60/976,759 filed Oct. 1, 2007, entitled "System and Method for Generating an Application Fragment".

BACKGROUND

The present disclosure relates to identifying reusable components in an existing application, and to systems and methods for generating an application fragment from a reusable component, such as by capturing the application fragment as an item in a file system.

The development of software applications has seen many advances since the inception of computing. For example, low-level languages utilized constructs that were very closely related to the hardware of the computing system on which programs were executed. The creation of high-level programming languages provided tools that were more abstract than corresponding low-level programming languages and delivered greater portability across different platforms. High-level programming languages also permitted programmers to express operations in terms of variables, mathematical formulas, and Boolean expressions, rather than memory addresses and registers.

The development of object-oriented programming concepts and object-oriented languages, such as C++, further permitted programmers to modularize software applications. Object-oriented programming emphasizes concepts including encapsulation, inheritance, and modularity. Specific purpose modules can be created using object-oriented techniques, such that the modules receive input from and/or provide output to one or more other modules. Additionally, separate modules in a program can be configured to communicate by passing data organized in accordance with constructs, such as classes, subclasses, and objects. Once created, such specific purpose modules can be reused in other programs by copying the source code and associated definitions.

Java further expanded the principles of object-oriented programming by introducing the concept of a virtual machine, which makes it possible to execute an application in a platform-independent environment. Once configured, the virtual machine exists as an environment above the operating system and the computing platform in which an application executes. Because a virtual machine can operate on a variety of computing platforms, an application can be executed in the virtual machine on any of the supported platforms without requiring customization. Thus, an application can be generated for use with a virtual machine such that the application is reusable across a variety of separate computing platforms.

Programming tools, or integrated development environments (IDEs), still further enhanced the ability of programmers to efficiently develop software applications. A programming tool can be used to prototype, code, debug, and maintain one or more software applications. Further, IDEs often include a graphical programming environment, in which features can be at least partially configured through the use of graphical tools. IDEs also can include a palette of standard components, such as controls and displays, that can be inserted into an application without having to be independently developed. Additionally, IDEs provide the ability to analyze and modify an existing application for which the source code is available.

SUMMARY

This specification describes technologies relating to capturing as a distinct file system object one or more components included in an existing application. An existing application, such as an application executing within the context of an application environment, can be configured to identify one or more reusable components included in the application. For example, a reusable component can be displayed such that it is visually distinguishable from the non-reusable components of an application, including through highlighting, low-lighting, outlining, shading, or any other such visual indication. Further, a reusable component can be copied from an existing application in which it is displayed, such as through a copy or drag operation. The application environment can be configured such that a reusable component copied from an existing application, the donor application, can be transferred into any view into a file system, e.g. a desktop or file folder, through an operation, such as a paste or drop. Additionally, the reusable component can be automatically captured as a persistent application fragment upon being transferred into the file system.

The present inventor recognized a need to permit associating an icon with the application fragment in a file system view. Further, the present inventor recognized a need to permit using an icon that is representative of the application fragment, such as a user interface representation or a class descriptor. In order to facilitate portability of one or more application fragments, the present inventor recognized that it would be beneficial to permit an application fragment to be transmitted between computing devices, such as through a file transfer operation or as part of an electronic message.

The present inventor also recognized a need to permit a plurality of reusable components to be copied out of a donor application and inserted into a file system representation. Further, the present inventor recognized a need to permit an application fragment residing in a file system to be inserted into a recipient application. Accordingly, the systems and apparatus described here can implement methods for generating an application fragment from a reusable component and for inserting a reusable component into an application based on an application fragment.

In general, in one aspect, the subject matter can be implemented to include presenting a component in a donor application window corresponding to a donor application, wherein the donor application is executing in a computing system; receiving input selecting the component in the donor application window for insertion into a file system associated with the computing system; generating an application fragment corresponding to the component; and storing the application fragment in the file system.

The subject matter also can be implemented such that the component includes a reusable component and the reusable component is visibly distinguishable from one or more non-reusable components displayed in the donor application window. Further, the subject matter can be implemented to include inserting the application fragment into a recipient application window associated with a recipient application and generating a component based on the application fragment in the recipient application. Also, the subject matter can be implemented to include activating the application fragment in the file system and generating an application including at least a component based on the application fragment in response to the activating. Additionally, the subject matter also can be implemented to include inserting the application fragment into a recipient application window associated with a recipient application and activating functionality of the recipient application based on the application fragment.

In general, in another aspect, the techniques can be implemented as a computer program product, encoded on a computer-readable medium, operable to cause data processing apparatus to perform operations including presenting a component in a donor application window corresponding to a donor application, wherein the donor application is executing in a computing system; receiving input selecting the component in the donor application window for insertion into a file system associated with the computing system; generating an application fragment corresponding to the component; and storing the application fragment in the file system.

The subject matter also can be implemented to be further operable to cause data processing apparatus to perform operations including receiving input inserting the application fragment into a recipient application window associated with a recipient application and generating a component based on the application fragment in the recipient application. Further, the subject matter can be implemented such that the component includes a reusable component and the reusable component is visibly distinguishable from one or more non-reusable components displayed in the donor application window. Also, the subject matter can be implemented to be further operable to cause data processing apparatus to perform operations including receiving input activating the application fragment in the file system and generating an application including at least a component based on the application fragment in response to the activating. Additionally, the subject matter can be implemented to be further operable to cause data processing apparatus to perform operations including receiving input inserting the application fragment into a recipient application window associated with a recipient application and activating functionality of the recipient application based on the application fragment.

In general, in another aspect, the subject matter can be implemented as a system including a computer-readable medium storing a donor application and a computing system including processor electronics configured to perform operations including presenting a component in a donor application window corresponding to the donor application, wherein the donor application is executing in a computing system; receiving input selecting the component in the donor application window for insertion into a file system associated with the computing system; generating an application fragment corresponding to the component; and storing the application fragment in the file system.

The subject matter also can be implemented such that the processor electronics are further configured to perform operations including receiving input inserting the application fragment into a recipient application window associated with a recipient application and generating a component based on the application fragment in the recipient application. Further, the subject matter can be implemented such that the component includes a reusable component and the reusable component is visibly distinguishable from one or more non-reusable components displayed in the donor application window. Also, the subject matter can be implemented such that the processor electronics are further configured to perform operations including receiving input activating the application fragment in the file system and generating an application including at least a component based on the application fragment in response to the activating. Additionally, the subject matter can be implemented such that the processor electronics are further configured to perform operations including receiving input inserting the application fragment into a recipient application window associated with a recipient application and activating functionality of the recipient application based on the application fragment.

In general, in another aspect, the subject matter can be implemented to include presenting a component associated with a donor application; receiving input selecting the component for insertion into a file system; generating an application fragment corresponding to the component; and storing the application fragment in the file system. In general, in another aspect, the techniques can be implemented as a computer program product, encoded on a computer-readable medium, operable to cause data processing apparatus to perform operations including presenting a component associated with a donor application; receiving input selecting the component for insertion into a file system; generating an application fragment corresponding to the component; and storing the application fragment in the file system. In general, in another aspect, the subject matter can be implemented as a system including a computer-readable medium storing a donor application and a computing system including processor electronics configured to perform operations including presenting a component associated with the donor application; receiving input selecting the component for insertion into a file system; generating an application fragment corresponding to the component; and storing the application fragment in the file system.

Particular embodiments of the subject matter described in this specification can be implemented to realize one or more of the following advantages. For example, the subject matter can be implemented to capture in a file system representation an application fragment corresponding to a reusable component associated with an application. Further, the subject matter can be implemented such that a plurality of application fragments can be stored and organized in a file system object, such as a folder. The subject matter also can be implemented to permit generating an application from an application fragment. Additionally, the subject matter can be implemented to permit adding a reusable component to an application by inserting the application fragment into the application.

This subject matter can be implemented in an apparatus, a method, a system, a computer program product, or any combination of an apparatus, methods, systems, and computer program products. The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 6 shows a flowchart describing an exemplary process for storing an application fragment.

Like reference numbers and designations in the various drawings indicate like elements.

DETAILED DESCRIPTION

Figure 1A:
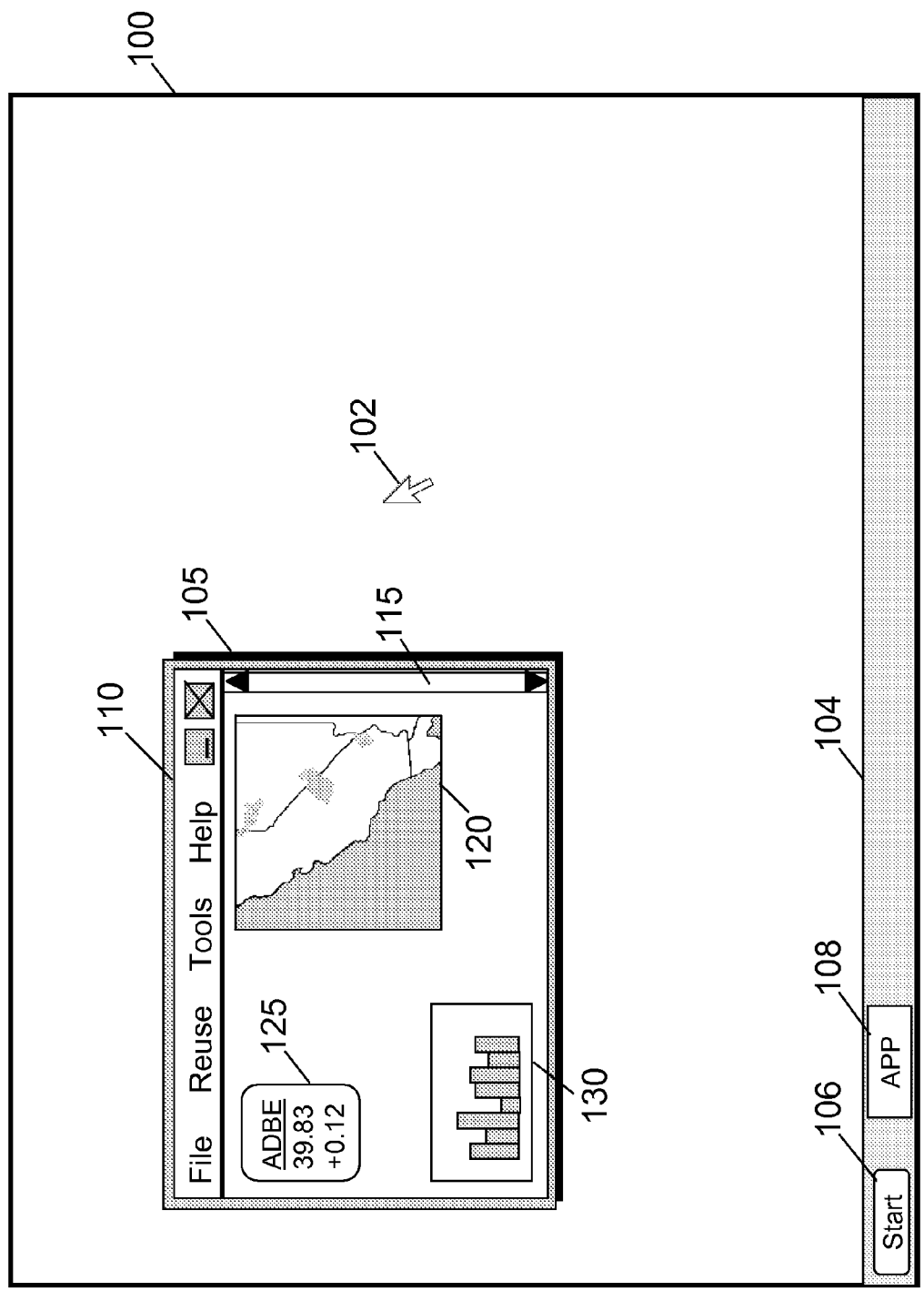
FIGS. 1A-1D show an exemplary interface that can be used to generate an application fragment based on one or more reusable components.

FIG. 1A shows an exemplary interface that can be used to execute an application that includes one or more reusable components. A reusable component is an element of a computer program that includes one or more instructions operable to implement one or more functions, where the computer program element can be extracted from the application program in which it appears and stored as an independent representation, such as an application fragment. An application fragment is a persistent file system object (or "object") that includes one or more items of information corresponding to at least one component, such as a reusable component associated with a donor application. For example, an application fragment can include information describing a component, such as an application name with which the component is associated, the class of the component, a path to a file representing a definition of the component, one or more properties of the component, one or more styles associated with the component, and an address at which source code corresponding to the component can be obtained.

An application from which a reusable component is shared is referred to as a donor application. Further, an application into which a reusable component is inserted, either directly or through use of an application fragment, is referred to as a recipient application. Additionally, the one or more donor applications and one or more recipient applications are associated with a common application environment. In some implementations, the application environment can be a cross-operating system runtime, such as Adobe® Integrated Runtime offered by Adobe Systems Incorporated of San Jose, Calif.

The interface can be presented in a graphical user interface ("GUI") environment, such as a desktop 100 presented by an operating system or the application environment. The desktop 100 can be configured to permit launching one or more applications (or "computer programs"). Further, the desktop 100 can permit a user to interact with an application through one or more inputs and controls, including graphical controls. For example, a user can control a cursor 102 displayed in the desktop 100 through a physical input device, such as a mouse or trackball, and enter commands to perform one or more operations. Additionally, the desktop 100 can include a menu bar 104, which can include one or more command buttons, such as a start button 106, and one or more icons associated with executing applications, such as the application icon 108.

A donor application executing in the application environment can be represented in the desktop 100 by a donor application window 105. The donor application window 105 can include a command menu 110 that lists a plurality of commands associated with functions that can be performed by the donor application. For example, the command menu 110 can include a plurality of menu titles, each of which corresponds to a list of one or more options and sub-menus. The command menu 110 also can include one or more command buttons associated with specific functions, such as minimizing or closing the donor application window 105. In some implementations, a tool tray containing one or more selectable tool items can be included in the donor application window 105 in place of or in conjunction with the command menu 110. Further, the one or more selectable tool items can correspond to one or more of the options and menu items otherwise included in the command menu 110.

In some implementations, the donor application window 105 can correspond to an application or service hosted on a remote server. The donor application window 105 can present a local interface corresponding to the hosted application or service, while the execution of at least some of the operations associated with the application or service can be performed at the remote server. For example, the donor application window 105 can be presented in association with a web browser application. Further, functionality associated with the donor application window 105 can be restricted based on a security context implementing one or more security controls, such as authentication, validation, and permissions. Thus, the extent to which the donor application window 105 or components contained therein can interface with the application environment can be controlled.

The donor application also can include a scroll bar 115 that allows for the selective display of the donor application window 105. The scroll bar 115 also can be implemented as a reusable component. Additionally, one or more other components associated with the donor application can be displayed in the donor application window 105. For example, a weather monitor 120 can be configured to display the current weather conditions for a particular region of the terrestrial globe. The weather monitor 120 also can be configured to present other information, such as time, temperature, and forecast data. The information presented by the weather monitor 120 can be collected from one or more data sources, including remote data sources. Further, a stock ticker 125 can be configured to present quotes for one or more securities or indexes. Similar to the weather monitor 120, the stock ticker 125 also can be configured to retrieve quote data from one or more data sources, including remote data sources. Additionally, a monitor 130 can be displayed in the donor application window 105. The monitor 130 can provide a graphical representation of the values associated with a data source. For example, the monitor 130 can provide a visual representation of sound being received through a microphone that is connected to the computing platform on which the donor application is hosted or sound data stored in an electronic file.

Figure 1B:
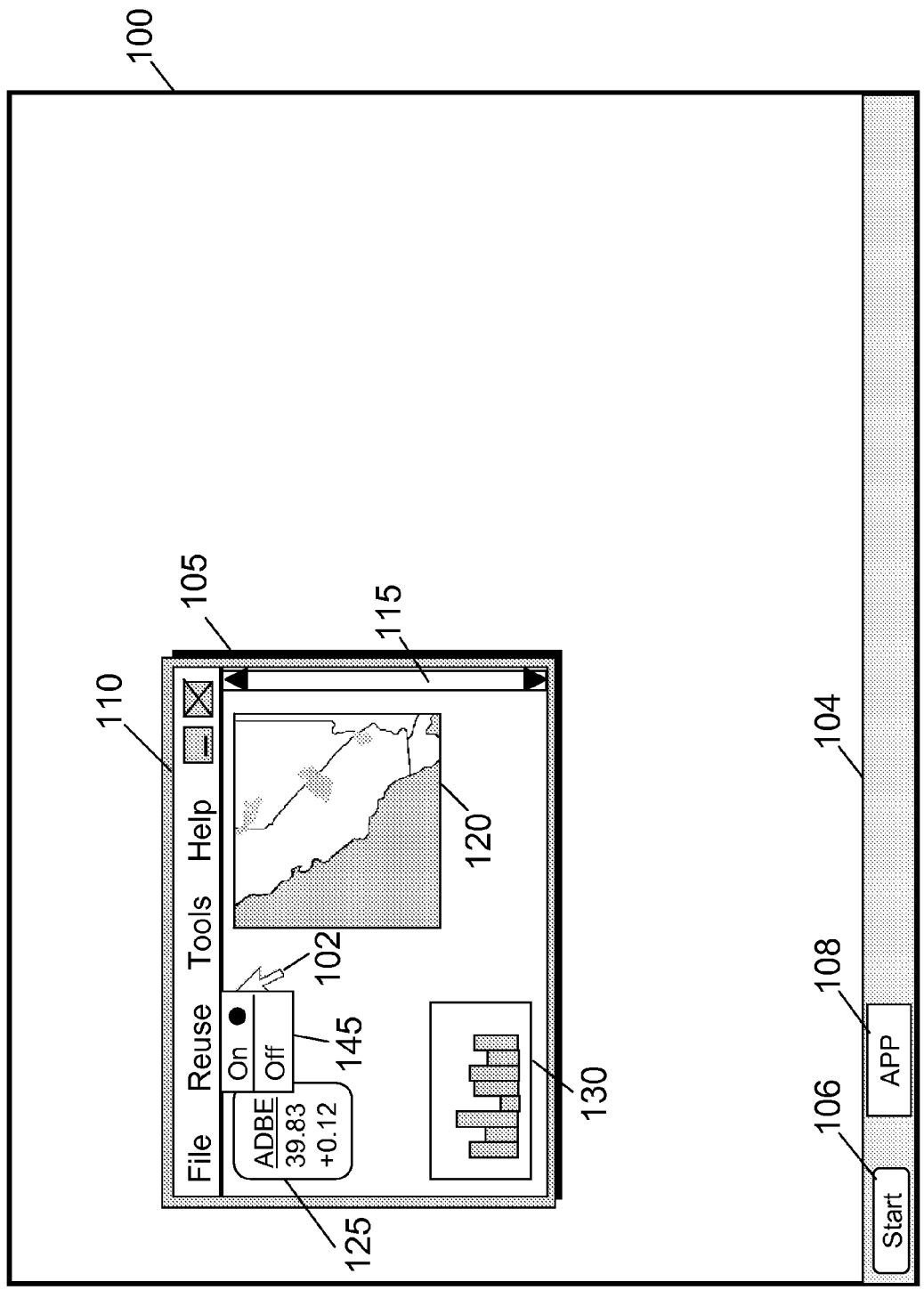

FIG. 1B shows an example of selecting the reuse menu 145 in the command menu 110 of the donor application window 105. The reuse menu 145 can be selected by positioning the cursor 102 in proximity to the reuse menu 145 and entering a command through a physical control device, such as a button push on a mouse. Alternatively, the reuse menu 145 can be selected through entry of a predetermined command, such as a function key or key-combination on a keyboard, or activation of a tool icon in a tool palette. The reuse menu 145 is configured to permit a user to turn the reuse function of the application on and off. Further, the reuse menu 145 presents a visual indicator to identify the presently selected menu option, such as a marker displayed adjacent to the selected option or by visually distinguishing the text used to represent the selected option. Alternatively, the reuse menu can be presented such that only the current option is displayed and selecting the current option causes it to be toggled (e.g., from "OFF" to "ON").

When the reuse function is turned off, the donor application performs routine operations, such as executing the functions associated with one or more components included in the donor application. When the reuse function is turned on, the donor application identifies the components that are available for reuse. A reusable component included in the donor application can be identified through a wide variety of cues, including visual and/or auditory cues provided through the interface. In some implementations, turning on the reuse function also enables the drag-and-drop functionality that can be used to copy or drag a reusable component from a donor application. Further, turning the reuse function on also enables a reusable component to be inserted into a file system view as an application fragment or directly into a recipient application.

Further, a donor application can be configured such that turning on the reuse function inhibits interaction with reusable components for functions other than arranging, repositioning, and resizing within the donor application, and copying and insertion into an entity other that the donor application. For example, when the reuse function is turned on in a donor application, command interfaces associated with a reusable component can be disabled. Thus, selecting a button included in a reusable component will not produce a button "click" event or initiate the corresponding functionality that results when the reuse function is turned off. Additionally, interaction with non-reusable components included in a donor application also can be inhibited when the reuse function is turned on. For example, a movie player can be configured to continue playing, but associated controls such as pause and rewind can be disabled so that the movie player is functionally inert.

Figure 1C:
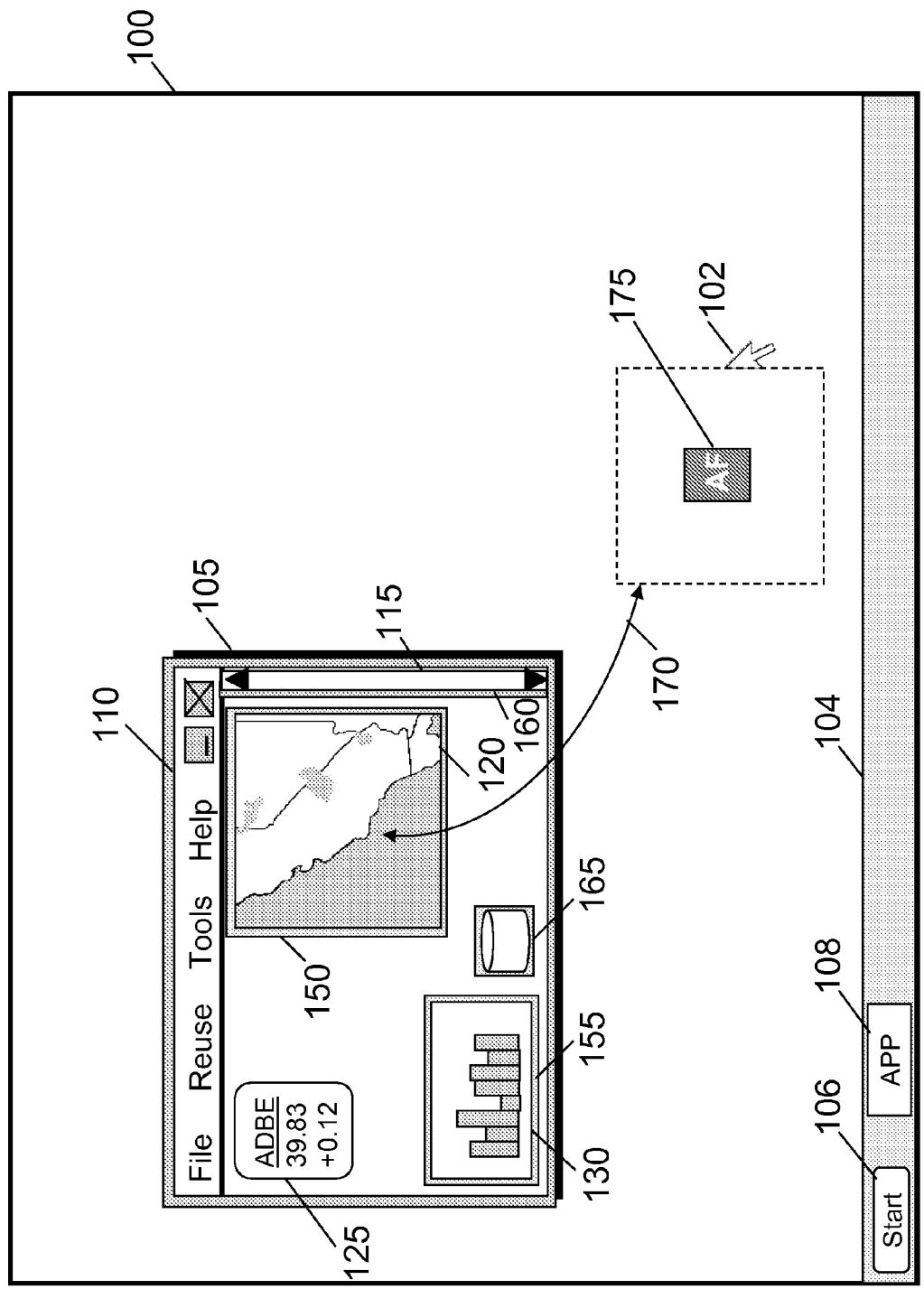

FIG. 1C shows an exemplary interface presented in the desktop 100 when the reuse function is turned on. A visual indicator can be associated with one or more reusable components to distinguish them from other portions of the donor application, including components that are not reusable. For example, a visible border can be display around a reusable component, such as the border 150 displayed around the weather monitor 120 or the border 155 displayed around the monitor 130. The visible border can be displayed to create a defined border around a reusable component that includes a different color or texture than the presentation of a non-reusable component included in the same window. Alternatively, the visible border can be presented as a "glow", "halo", or "drop shadow" effect that surrounds the reusable component. In some implementations, a reusable component also can be presented as raised or three-dimensional with respect to the user interface.

Further, the visible border can be displayed persistently, or can be displayed intermittently in response to an interface event, such as in response to a cursor coming within a predetermined range of a reusable component. In some implementations, non-reusable components can be visually distinguished from reusable components by diminishing their visual presentation in the application window, such as by fading or graying the non-reusable components. Diminishing the visual presentation of non-reusable components can be performed in conjunction with or instead of enhancing the visual presentation of reusable components, such as through the use of a visible border. Interface components and controls also can include a visible border if they are reusable. For example, the scroll bar 115 can include a visible border 160 to indicate that it is a reusable component. Alternatively, interface components can be highlighted or shaded to indicate that they are reusable.

Additionally, reusable components that generally do not have an associated visual presentation can be represented by an icon when the reuse function is turned on. For example, when reuse is turned on through the reuse menu 145 of the donor application, a database icon 165 can be presented in the donor application window 105. The database icon 165 can be used to represent a data source accessible to the donor application (or an interface to such a data source) that does not have a visual representation when the reuse function is turned off. Further, the database icon 165 can be presented with a visible border indicating that it is reusable. Alternatively, one or more reusable components that generally do not have an associated visual presentation can be represented in a tray or toolbox that is displayed when the reuse function is turned on. The tray or toolbox can be part of or separate from the donor application window 105 interface. In some implementations, a reusable component can be identified by an audible indicator in conjunction with a visual indicator. For example, a distinctive sound can be presented to identify a reusable component in response to an interface event, such as a cursor coming within a predetermined range of the reusable component.

A reusable component can be "grabbed" in the interface, such as through the use of a cursor controlled by a mouse. Once grabbed, the reusable component can be dragged from the donor application. For example, the weather monitor 120 can be grabbed in the donor application window 105 and dragged 170 across the interface to an open space on the desktop 100. By dropping the weather monitor 120 on the desktop 100, an application fragment is created in the file system of the computing device presenting the desktop 100. The application fragment is then preserved as a persistent, on-disk representation of the reusable component dragged from the donor application window 105.

In some implementations, the selected component can be included in a clipboard maintained by the operating system of the computing device. A temporary file including a serialized representation of the clipboard contents can be generated when the drag is initiated. The location of the temporary file further can be added to the clipboard as a data source. Dropping the selected component onto a location in a file system view can cause the temporary file to be moved to that location.

The application fragment can represent the state of the reusable component at the time it was dragged from the donor application window 105, a default state of the reusable component, or any combination thereof. Further, the newly created application fragment can be represented by a file icon 175, which can be displayed in the location on the desktop 100 at which the weather monitor 120 was dropped. In some implementations, a reusable component can be cut or copied from the donor application window 105, such as by a menu selection or a key-based command, including a "CTRL-C" or a "CTRL-X" command.

An application fragment, such as the application fragment represented by the file icon 175, is a file system object that corresponds to a reusable component copied from a donor application. Thus, an application fragment can include one or more user interface components and corresponding elements. An application fragment also can include one or more components and/or elements that do not have a presence in the user interface when the reuse function is turned off, such as a data source. A data source can be connected to another component that can be used to present a visual representation of data provided by the data source. The connection between a data source and a component presenting a visual representation can be formed automatically, such as by proximity or sequence, or based on user input. For example, the database represented by the database icon 165 is a data source that can be connected to a component that includes a user interface representation, such as a visual output. An application fragment also can identify an association between two or more components, such as data flow connections between the components or the relative positions between the components.

Further, an application fragment corresponding to a reusable component can be generated when the reusable component is inserted into any view of a file system, such as a desktop, a file directory, or a file folder. The reusable component can be inserted into a file system by any predetermined insert command, including a drop command, a menu selection, or a key-based command, such as the "CTRL-V" paste command.

Additionally, a view into a file system also can include an open file associated with the file system, such as a text document or an image file. For example, inserting a reusable component into a text document can cause one or more items of text data corresponding to the reusable component to be recorded in the text document, such as a property list and/or source code. Further, inserting a reusable component into an image file can cause an image corresponding to the reusable component to be recorded in the image file, such as a user interface representation of the component. In some implementations, the view of the file system also can encompass a file system corresponding to a remote computing device. For example, the reusable component can be dropped or otherwise inserted into a file viewer, file transfer window, or browser window associated with a remote computing device.

An application fragment also can be utilized to generate a component in an executing application. For example, an application fragment can be inserted into a recipient application by dragging or otherwise copying the file icon associated with the application fragment from a file system representation into the recipient application. Further, the recipient application can be configured to generate the component corresponding to the application fragment upon detecting that the application fragment has been inserted.

Additionally, an application fragment stored in a file system can be utilized to generate a new application. For example, an application fragment can be activated by a user selecting the file icon associated with the application fragment, such as by a double-click operation. Alternatively, the application fragment can be activated by selecting a menu option associated with the application fragment. For example, a user can right-click on the file icon associated with the application fragment and select a new application option from a menu. In some implementations, the new application option can correspond to an application template included in the application environment. Upon activating the application fragment, a new application containing the component corresponding to the application fragment can be created in the application environment. One or more additional components also can be added to the new application, such as by inserting one or more additional application fragments or by dragging and dropping a component directly from a donor application.

Figure 1D:
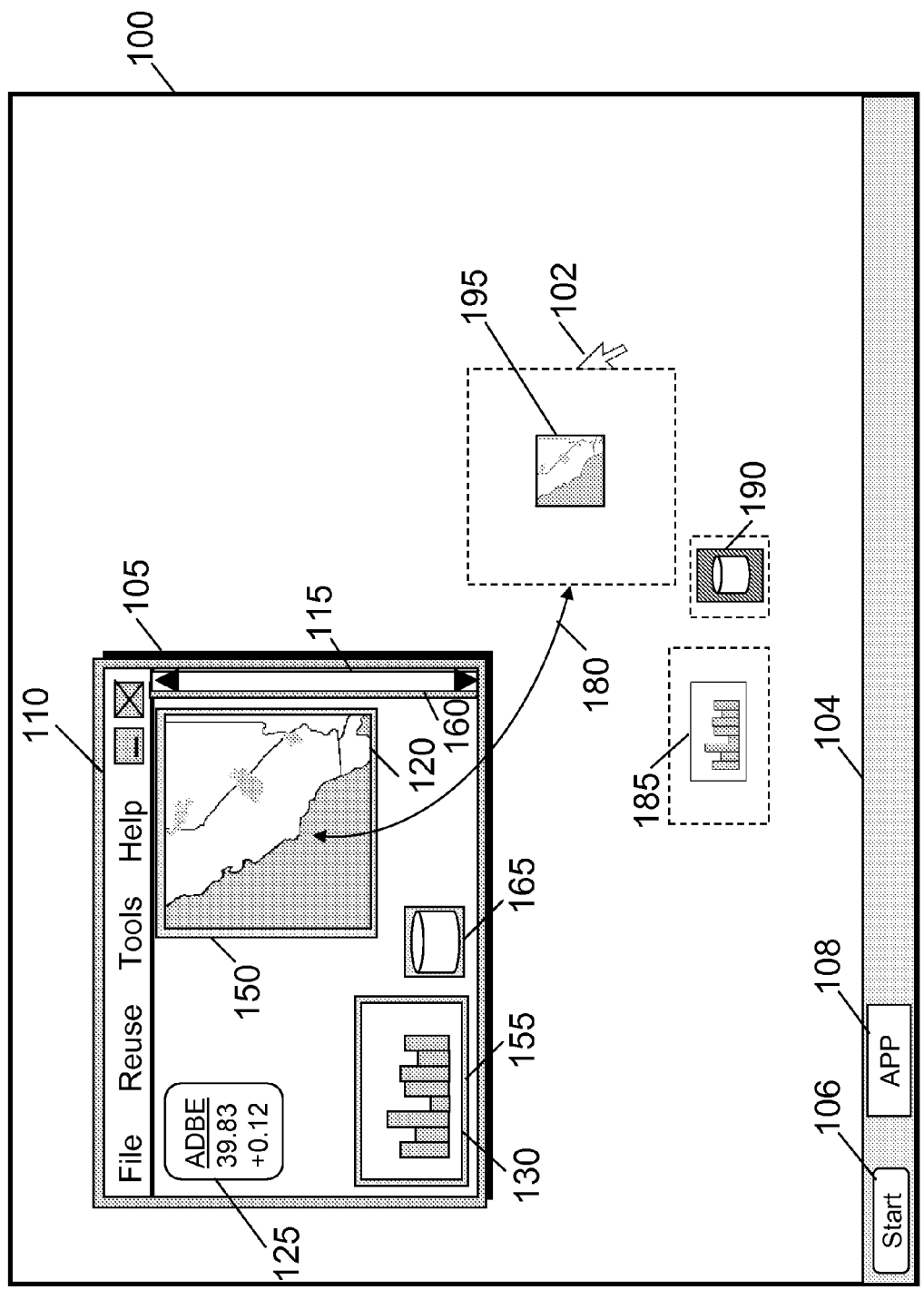

FIG. 1D shows an exemplary interface presented in the desktop 100 wherein a plurality of reusable components can be dropped in a single action. A plurality of reusable components, such as the monitor 130, the database icon 165, and the weather monitor 120 can be concurrently selected in the donor application window 105. For example, the reusable components can be selected using a ctrl-click or shift-click operation, such that the plurality of reusable components are in a selected or active state at the same time. Further, the plurality of reusable components can be transferred from the donor application window 105 to an area over the desktop 100, such as by a drag-and-drop operation 180.

Once over the desktop 100, the plurality of reusable components can be dropped onto an area of the desktop 100. In response to the dropping, an application fragment corresponding to each of the plurality of reusable components can be created in the file system of the computing device presenting the desktop 100. Further, a file icon corresponding to each application fragment can be displayed on the desktop 100. For example, a monitor file icon 185 corresponding to the monitor 130, a database file icon 190 corresponding to the database icon 165, and a weather monitor file icon 195 corresponding to the weather monitor 120 can be created in response to the drag-and-drop operation 180. The file icons created can retain the relative spacing and position that existed between the reusable components and the desktop when dropped or can be ordered in any other fashion, such as based on an application or desktop setting.

Additionally, the file icon created can represent an aspect of the application fragment with which it is associated. For example, the file icon created for a reusable component that has a user interface representation can include an image corresponding to the user interface representation, such as a thumbnail or other reduced resolution depiction. Thus, the weather monitor file icon 195 can include a thumbnail representative of the weather monitor 120. A file icon also can be selected to represent the type of reusable component to which the application corresponds, such as the class or super-class of the reusable component. For example, the database file icon 190 can include a visual identifier associated with a data class. Further, a file icon can indicate that an application fragment represents a plurality of components. For example, the file icon can present an appearance of multiple items, such as stacked pages or interfaces. The file icon associated with an application fragment also can be edited by a user, to manipulate or customize the appearance of the file icon. Thus, application fragments can be visually distinguished based on their associated file icons.

In some implementations, a plurality of reusable components dragged from a donor application window and dropped onto a desktop can be captured in the file system as a single application fragment and can be represented by a single file icon. For example, the monitor 130, the database icon 165, and the weather monitor 120 can be concurrently selected in the donor application window 105 and dropped onto the desktop 100. In response to being dropped, information relating to the monitor 130, the database icon 165, and the weather monitor 120 can be combined into a single application fragment stored in the file system. Further, the single application fragment can be represented by a single file icon. The determination to create a single application fragment corresponding to a plurality of components can be based on a setting in the donor application, a setting in the file system, or a command entered at the time the plurality of components are selected or dropped.

Figure 2:
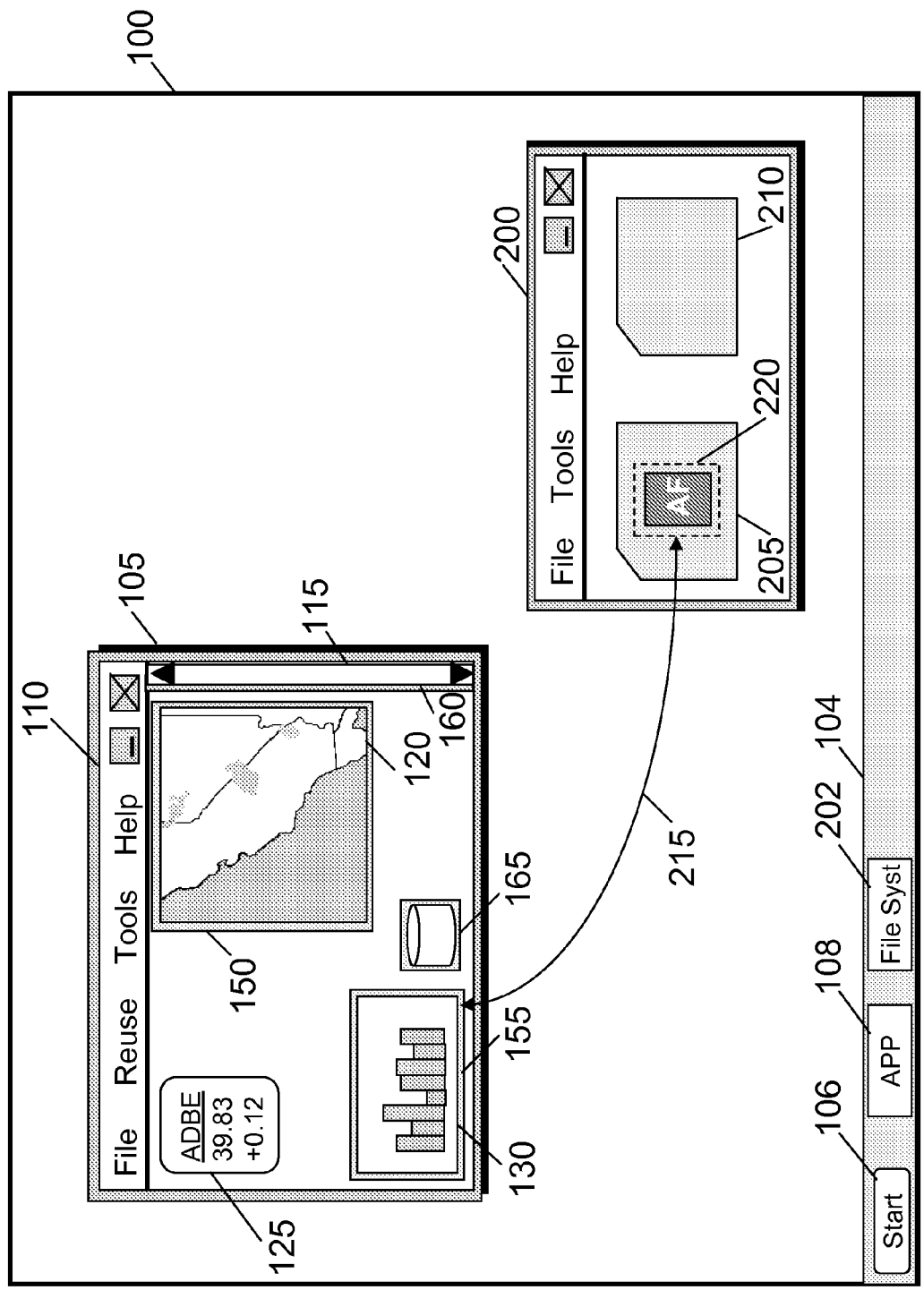
FIG. 2 shows an exemplary interface presented on the desktop that permits creating an application fragment in a file system representation.

FIG. 2 shows an exemplary interface presented in the desktop 100 that permits creating an application fragment in a file system representation. A file system viewer window 200 can be displayed on the desktop 100. The file system viewer window 200 can present information associated with one or more portions of a file system, such as a directory of a volume corresponding to a storage device. For example, the file system viewer window 200 can include a plurality of folders, such as folders 205 and 210, each of which can contain additional folders and/or files. Additionally, the menu bar 104 of the desktop 100 can include a file system viewer icon 202 associated with the file system viewer window 200.

A reusable component can be selected in the donor application window 105 and copied into the file system viewer window 200. For example, the monitor 130 can be selected in the donor application window 105 and copied to the file system viewer window 200 through a drag-and-drop operation 215. Further, the monitor 130 can be dropped in any portion of the file system viewer window 200. For example, the monitor 130 can be dropped on the folder 205 presented in the file system viewer window 200. As a result of dropping the monitor 130 on the folder 205, an application fragment corresponding to the monitor component of the donor application window 105 is created in the file system.

The application fragment corresponding to the monitor component can be stored in the logical portion of the file system associated with the folder 205. A monitor file icon 220 also can be created in the folder 205 to represent the application fragment. Alternatively, the monitor 130 can be dropped in an open space of the file system viewer window 200. As a result, the application fragment and associated monitor file icon 220 can be represented as a file at the same hierarchical level of the file system as the folders 205 and 210. Additionally, once the application fragment and associated monitor file icon 220 have been created in the file system, they can be moved within the file system, copied, or deleted in the same manner as any other file system object.

Further, one or more application fragments and associated file icons can be organized in the file system. Application fragments corresponding to the same type, function, category, or other such criteria can be grouped in a common directory or folder. For example, one or more application fragments that represent interface items, such as buttons, can be grouped in a first folder, while one or more application fragments that represent data sources can be stored separately in a second folder. Any number of file system structures can be used to organize the application fragments. Additionally, the application fragments can be sorted based on an attribute in one or more file system views. For example, the application fragments presented in a detailed view of a file system component, such as a folder, can be sorted based on one or more exposed attributes of the application fragments, including the super-class to which the application fragment belongs, the number of components included in the application fragment, the type of application fragment, and the number of inputs and/or outputs associated with a component represented by the application fragment.

A plurality of folders and/or directories can be created and populated with application fragments to form a library of components. The library of components can be used to generate components in new and existing applications. Further, the library of components can be shared, such as by transferring one or more application fragments to file systems hosted on other computing devices.

Additionally, the application fragments stored in the file system can be dormant. A dormant application fragment cannot be executed except through insertion into an existing recipient application or by selecting an option to create a new application based on the application fragment. Thus, application fragments corresponding to incompatible components can be stored in the same folder or directory, as dormant application fragments will not interact with one another to cause a conflict.

Figure 3:
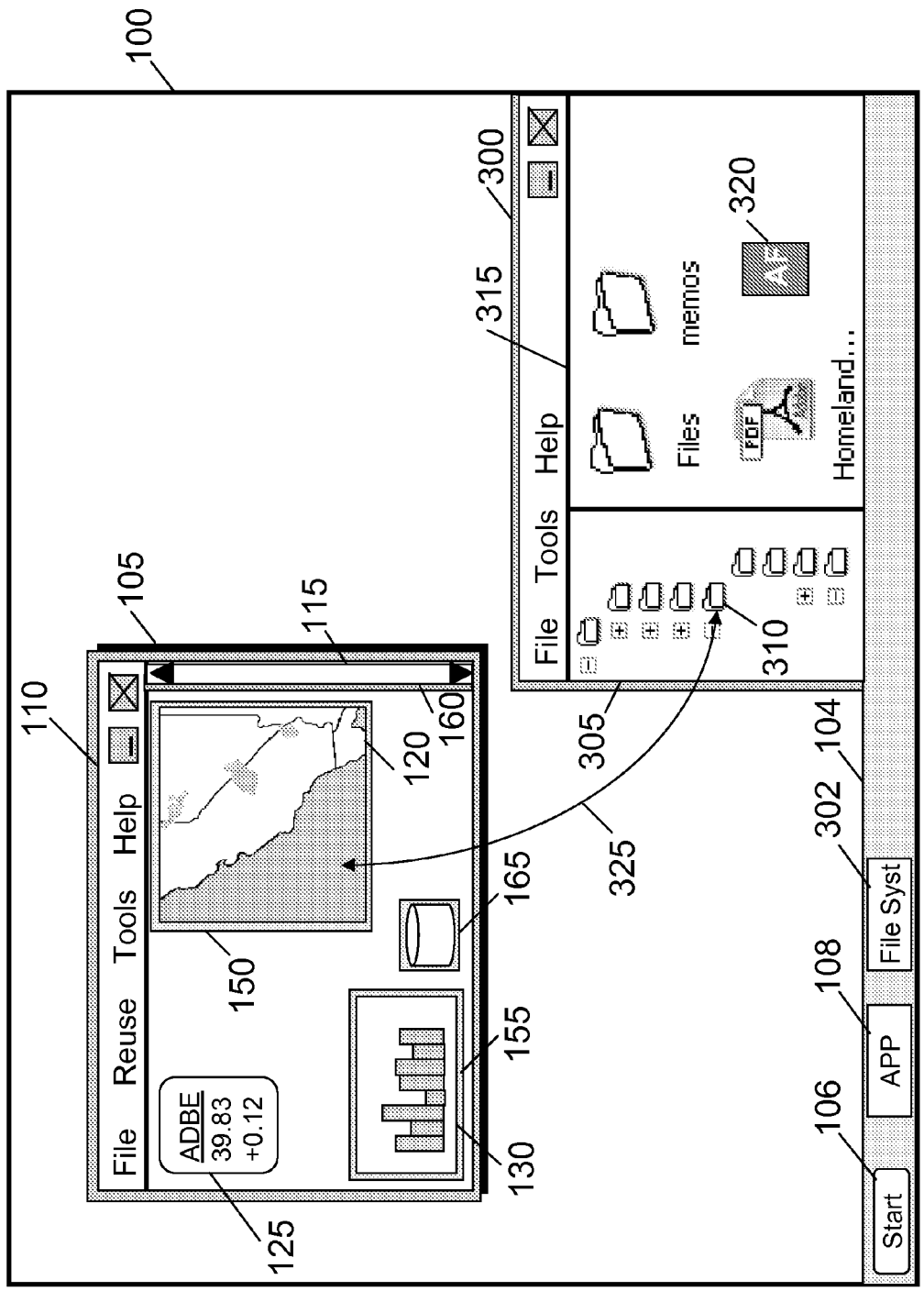
FIG. 3 shows an exemplary interface presented in a desktop that permits creating an application fragment in a hierarchical file system representation.

FIG. 3 shows an exemplary interface presented in the desktop 100 that permits creating an application fragment in a hierarchical file system representation. A hierarchical file system window 300 can be displayed on the desktop 100. Additionally, the menu bar 104 of the desktop 100 can include a file system icon 302 associated with the hierarchical file system window 300. The hierarchical file system window 300 can present information associated with one or more portions of a file system, such as a directory structure that includes one or more folders and volumes. The hierarchical file system window 300 can include a directory tree pane 305, which can display the relationship between a plurality of folders and volumes, including the folder 310. The hierarchical file system window 300 also can include a contents pane 315, which can display the contents of a presently selected folder, such as the folder 310.

A reusable component can be selected in the donor application window 105 and copied into the hierarchical file system window 300. For example, the weather monitor 120 can be selected in the donor application window 105 and copied to the hierarchical file system window 300 through a drag-and-drop operation 325. Further, the weather monitor 120 can be dropped in any portion of the hierarchical file system window 300. For example, the weather monitor 120 can be dropped on the folder 310 presented in the directory tree pane 305. As a result of dropping the weather monitor 120 on the folder 310, an application fragment corresponding to the weather monitor component of the donor application window 105 is created in the file system. Further, a weather monitor file icon 320 can be created in the contents pane 315 corresponding to the folder 310. Alternatively, the weather monitor 120 can be dropped directly in the contents pane 315.

Figure 4:
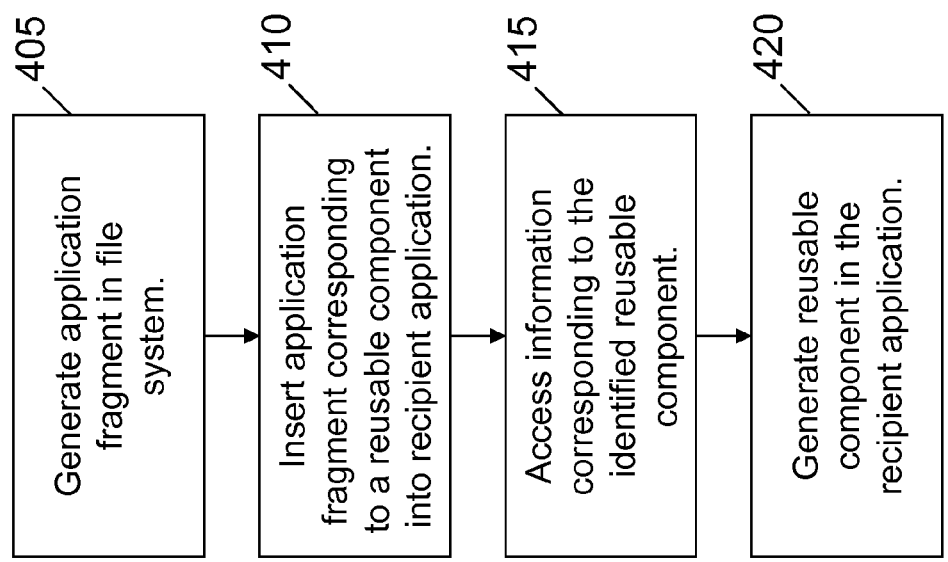
FIG. 4 shows a flowchart describing an exemplary process for using an application fragment to insert a component into an application.

FIG. 4 shows a flowchart describing an exemplary process for using an application fragment to insert a component into an application. An application fragment can be generated in a file system associated with a computing device (405). An application fragment can be generated by transferring a reusable component from a donor application to any view into a file system. For example, the reusable component can be transferred from the donor application to the file system by a drag-and-drop operation or a copy-and-paste operation. Once captured in the file system, the application fragment can be stored as a file and identified by an associated application fragment icon. In some implementations, an application fragment also can be transferred between computing devices through a file transfer, including by attachment to an electronic message, file transfer over a network, or manual transfer on transportable storage media.

Further, an application fragment corresponding to a reusable component can be selected in the file system and inserted into a recipient application (410). For example, an icon associated with the application fragment can be dragged from a graphical representation of the file system and dropped into a user interface associated with the recipient application. In some implementations, the recipient application can correspond to an application or service hosted on a remote server. The user interface associated with the recipient application can be a local interface corresponding to the hosted application or service, while the execution of at least some of the operations associated with the application or service can be performed at the remote server. For example, the user interface associated with the recipient application can be presented in association with a web browser application. Further, the ability of the recipient application to accept an application fragment can be restricted based on a security context implementing one or more security controls, such as authentication, validation, and permissions.

In some implementations, one or more areas at which the application fragment can be dropped can be identified in the user interface of the recipient application. Additionally, one or more components in the recipient application can be resized and/or repositioned based on the area in which the application fragment icon is dropped. The application fragment also can be inserted into the recipient application through a command operation, such as a cut-and-paste or copy-and-paste operation. The recipient application can be any existing application that can be modified or any new application.

The application fragment can include one or more items of data describing the reusable component, such as properties. For example, the application fragment can be configured as a specification of how a component can be instantiated in a recipient application. The application fragment also can include information describing a location at which an implementation of the component can be found, such as a link to source code corresponding to the component. Additionally, the information included in the application fragment can be represented in any format, including binary data, text, or a mark-up language such as Extensible Markup Language (XML).

In some implementations, an application fragment can be configured as a serialization of a plurality of objects, such as Adobe Flex ActionScript Objects offered by Adobe Systems Incorporated of San Jose, Calif. The objects in an application fragment can describe one or more components, which can be associated with a local computing device or a remote computing device. Further, the objects can disclose one or more of the application name with which the component is associated, the class of the component, a path to a file representing a definition of the component, one or more properties of the component, one or more styles associated with the component, and an address at which source code corresponding to the component can be obtained.

The one or more data items in the application fragment can be read by the recipient application and utilized to access information corresponding to the identified reusable component (415). If the information corresponding to the reusable component is located on a remote computing device, the information can be retrieved over a network, such as a local area network or the Internet. Further, the information corresponding to the reusable component can be used to generate a working copy of the reusable component in the recipient application (420). In some implementations, the application fragment can include all of the information necessary to generate a working copy of the reusable component in the recipient application. In such an implementation, retrieval of additional information can be omitted.

Figure 5:
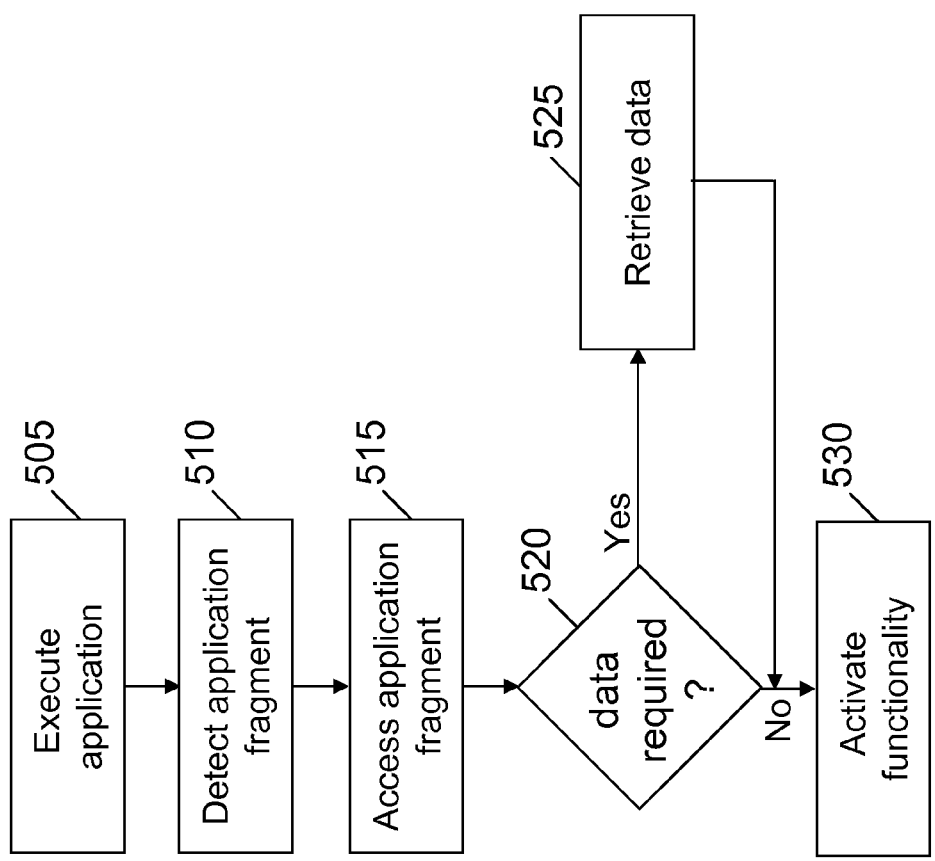
FIG. 5 shows a flowchart describing an exemplary process for activating functionality in an application.

FIG. 5 shows a flowchart describing an exemplary process for activating functionality in an application. A recipient application can be executed in a computing system (505). The recipient application can be an existing application in which particular functionality is not included or enabled. For example, one or more functions of the existing application, such as optional features, can be disabled pending the purchase of an upgrade. The functionality of a trial-version of an application also can be restricted pending the purchase of a license. Similarly, one or more add-on features can be made separately available for the application, such as by a third-party. The recipient application also can be a new application in which some or all of the functionality has not been enabled. In some implementations, one or more upgrades to an existing application also can be provided as additional functionality, such as security patches and bug fixes.

The recipient application can detect the insertion of an application fragment during execution (510). For example, the recipient application can determine that an application fragment has been dropped on a user interface associated with the recipient application. The recipient application also can detect a paste or other such insertion operation. Further, the recipient application can access the application fragment to determine its content (515). The application fragment can include one or more properties and values identifying the functionality or component it represents. The recipient application also can determine whether the application fragment should be further processed based on the one or more properties. For example, if the recipient application determines that the functionality associated with the application fragment has been previously installed or activated, the recipient application can ignore the application fragment. Alternatively, if the recipient application determines that the functionality associated with the application fragment has not been enabled, such as if the associated function is inactive or if the application fragment relates to a license for using the application, the recipient application can utilize the application fragment.

Further, the recipient application can determine whether one or more items of additional data are required to implement the functionality associated with the application fragment (520). For example, the application fragment can include only a limited amount of data describing the functionality and identifying a location from which additional data for implementing the functionality can be retrieved. Alternatively, the application fragment can include all of the data necessary for implementing the functionality. The application fragment also can represent a key or license that can be used to activate functionality that already is present in the recipient application. If additional data is needed, the data can be retrieved from a location indicated by the application fragment (525). Once the data has been retrieved, or if additional data was not needed, the recipient application can activate the corresponding functionality (530). For example, the recipient application can enable one or more functions or install source code associated with the application fragment. In some implementations, the recipient application can interact with the application environment to activate functionality based on an application fragment.

FIG. 6 shows a flowchart describing an exemplary process for storing an application fragment. Initially, a component is presented in a donor application window corresponding to a donor application, wherein the donor application is executing in a computing system (605). Input can be received selecting the component in the donor application window for insertion into a file system associated with the computing system (610). An application fragment corresponding to the component can be generated (615). Once the application fragment has been generated, the application fragment can be stored in the file system (620).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method of storing an application fragment, the method comprising:
   presenting a reusable component in a donor application window corresponding to a donor application, wherein the donor application is executing in a computing system;
   receiving first input activating a reuse function associated with the donor application;
   in response to receiving the first input, visually distinguishing the reusable component from one or more non-reusable components presented in the donor application window and enabling selection of the reusable component for insertion into a file system associated with the computing system;
   receiving second input selecting the reusable component in the donor application window for insertion into the file system associated with the computing system;
   generating an application fragment corresponding to the reusable component; and
   storing the application fragment in the file system.

2. The computer-implemented method of claim 1, further comprising:
   in response to the first input activating the reuse function associated with the donor application, disabling a command interface associated with the reusable component.
3. The computer-implemented method of claim 1, further comprising:
   inserting the application fragment into a recipient application window associated with a recipient application; and
   generating a component based on the application fragment in the recipient application.
4. The computer-implemented method of claim 1, further comprising:
   activating the application fragment in the file system; and
   generating an application including at least a component based on the application fragment in response to the activating.
5. The computer-implemented method of claim 4, wherein activating the application fragment comprises double-clicking a file system representation of the application fragment.
6. The computer-implemented method of claim 1, further comprising:
   in response to receiving the second input selecting the reusable component, copying the reusable component to a clipboard maintained by an operating system of the computing device, and
   wherein generating an application fragment corresponding to the reusable component includes generating a temporary file including a persistent form of the clipboard contents; and
   wherein storing the application fragment in the file system includes storing the temporary file at a designated location in the file system.
7. The computer-implemented method of claim 1, wherein the donor application is associated with an application environment comprising a cross-operating system runtime.
8. The computer-implemented method of claim 1, further comprising:
   inserting the application fragment into a recipient application window associated with a recipient application; and
   activating functionality of the recipient application based on the application fragment.
9. A computer program product, encoded on a computer-readable medium, operable to cause data processing apparatus to perform operations comprising:
   presenting a reusable component in a donor application window corresponding to a donor application, wherein the donor application is executing in a computing system;
   receiving first input activating a reuse function associated with the donor application;
   in response to receiving the first input, visually distinguishing the reusable component from one or more non-reusable components presented in the donor application window and enabling selection of the reusable component for insertion into a file system associated with the computing system;
   receiving second input selecting the reusable component in the donor application window for insertion into the file system associated with the computing system;
   generating an application fragment corresponding to the reusable component; and
   storing the application fragment in the file system.
10. The computer program product of claim 9, further operable to cause data processing apparatus to perform operations comprising:
    in response to the first input activating the reuse function associated with the donor application, disabling a command interface associated with the reusable component.
11. The computer program product of claim 9, further operable to cause data processing apparatus to perform operations comprising:
    receiving input inserting the application fragment into a recipient application window associated with a recipient application; and
    generating a component based on the application fragment in the recipient application.
12. The computer program product of claim 9, further operable to cause data processing apparatus to perform operations comprising:
    receiving input activating the application fragment in the file system; and
    generating an application including at least a component based on the application fragment in response to the activating.
13. The computer program product of claim 12, wherein receiving input activating the application fragment comprises receiving a double-click associated with a file system representation of the application fragment.
14. The computer program product of claim 9, further operable to cause data processing apparatus to perform operations comprising:
    in response to receiving the second input selecting the reusable component, copying the reusable component to a clipboard maintained by an operating system of the computing device, and
    wherein generating an application fragment corresponding to the reusable component includes generating a temporary file including a persistent form of the clipboard contents; and
    wherein storing the application fragment in the file system includes storing the temporary file at a designated location in the file system.
15. The computer program product of claim 9, wherein the donor application is associated with an application environment comprising a cross-operating system runtime.
16. The computer program product of claim 9, further operable to cause data processing apparatus to perform operations comprising:
    receiving input inserting the application fragment into a recipient application window associated with a recipient application; and
    activating functionality of the recipient application based on the application fragment.
17. A system comprising:
    a donor application stored on a computer-readable medium; and
    a computing system including processor electronics configured to perform operations comprising:
    presenting a reusable component in a donor application window corresponding to the donor application, wherein the donor application is executing in a computing system;
    receiving first input activating a reuse function associated with the donor application;
    in response to receiving the first input, visually distinguishing the reusable component from one or more non-reusable components presented in the donor application window and enabling selection of the reusable component for insertion into a file system associated with the computing system;

receiving second input selecting the reusable component in the donor application window for insertion into the file system associated with the computing system;

generating an application fragment corresponding to the reusable component; and storing the application fragment in the file system.

18. The system of claim 17, wherein the processor electronics are further configured to perform operations comprising:

in response to the first input activating the reuse function associated with the donor application, disabling a command interface associated with the reusable component.

19. The system of claim 17, wherein the processor electronics are further configured to perform operations comprising:

receiving input inserting the application fragment into a recipient application window associated with a recipient application; and generating a component based on the application fragment in the recipient application.

20. The system of claim 17, wherein the processor electronics are further configured to perform operations comprising:

receiving input activating the application fragment in the file system; and generating an application including at least a component based on the application fragment in response to the activating.

21. The system of claim 20, wherein receiving input activating the application fragment comprises receiving a double-click associated with a file system representation of the application fragment.

22. The system of claim 17, wherein the processor electronics are further configured to perform operations comprising:

in response to receiving the second input selecting the reusable component, copying the reusable component to a clipboard maintained by an operating system of the computing device, and wherein generating an application fragment corresponding to the reusable component includes generating a temporary file including a persistent form of the clipboard contents; and wherein storing the application fragment in the file system includes storing the temporary file at a designated location in the file system.

23. The system of claim 17, wherein the donor application is associated with an application environment comprising a cross-operating system runtime.

24. The system of claim 17, wherein the processor electronics are further configured to perform operations comprising:

receiving input inserting the application fragment into a recipient application window associated with a recipient application; and activating functionality of the recipient application based on the application fragment.

* * * * *